United States Patent Office 3,338,929
Patented Aug. 29, 1967

3,338,929
17-OXYGENATED 5α-ESTR-2-EN-11β-OLS, 17-ALKYLATED AND ESTERIFIED DERIVATIVES THEREOF
Paul D. Klimstra, Northbrook, and John S. Baran, Morton Grove, Ill., assignors to G. D. Searle & Co., Chicago, Ill., a corporation of Delaware
No Drawing. Filed Aug. 26, 1965, Ser. No. 482,898
11 Claims. (Cl. 260—397.45)

This invention is concerned with novel oxygenated olefinic steroidal derivatives which are more particularly described as 17-oxygenated 5α-estr-2-en-11β-ols and the 17-alkylated and esterified derivatives thereof. These compounds are structurally illustrated by the following formula

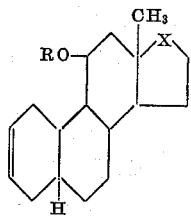

wherein R can be hydrogen or a lower alkanoyl radical and X is a carbonyl or radical of the formula

Y being hydrogen or a lower alkanoyl radical and Z being hydrogen or a lower alkyl radical.

Suitable starting materials for the manufacture of the instant compounds are the 17-oxygenated 5α-estrane-3,11β-diols represented by the following formula

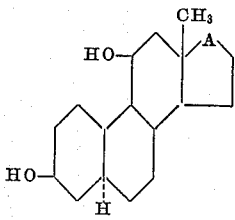

wherein A is a carbonyl, ketalized carbonyl, or

group, Y being hydrogen, a lower alkanoyl or readily hydrolyzable ether function, e.g. tetrahydropyranyl, and Z being hydrogen or a lower alkyl radical. Selective dehydration at the 3-position, typically by formation of a suitable ester such as the p-toluenesulfonate followed by heating of that ester at elevated temperature in the presence of an organic base such as collidine, results in the instant 2,3-dehydro derivatives. Those processes are specifically exemplified by the reaction of 17α-methyl-5α-androstane-3β,11β,17β-triol with p-toluenesulfonyl chloride in pyridine followed by heating of the resulting 3-p-toluenesulfonate in collidine at the reflux temperature, thus affording 17α-methyl-5α-estr-2-ene-11β,17β-diol.

The above described 17-oxygenated 5α-estrane-3β,11β-diol starting materials are conveniently obtained by several alternative routes. Reduction of the corresponding 3-keto-Δ⁴ precursors, typically with lithium in liquid ammonia, thus results in concomitant conversion of the carbonyl and olefinic moieties. As a specific illustration, 17α-methyl-11β,17β-dihydroxyestr-4-en-3-one in tetrahydrofuran is allowed to react with lithium and liquid ammonia, in that manner providing 17β-methyl - 5α - estrane-3β,11β,17β-triol. In the case of a 17-desalkyl precursor, the 17-hydroxy function is first protected by an easily removable group prior to initiation of the succeeding steps. Thus, 11β,17β-dihydroxyestr-4-en-3-one is allowed to react with dihydropyran in the presence of an acidic catalyst such as p-toluenesulfonic acid, resulting in selective formation of the 17-tetrahydropyran-2-yl ether. Reduction of the 3-keto-Δ⁴ system with lithium in liquid ammonia, by a process analogous to that described above affords 17β-tetrahydropyran-2-yloxy-5α-androstane-3β,11β-diol, which is then converted to the corresponding 2,3-dehydro compound through formation of the intermediate 3-p-toluenesulfonate by the procedure described above. Removal of the tetrahydropyran-2-yl protecting group to afford the instant 5α-estr-2-ene-11β,17β-diol is effected by reaction with p-toluenesulfonic acid in methanol.

An alternate procedure for manufacture of the required 3β,11β-dihydroxyestrane starting materials is illustrated by a process beginning with androsta-1,4-diene-3,11,17-trione. Selective formation of the 17-ethylene ketal followed by reduction of the 11-keto group and aromatization of the A-ring affords 3,11β-dihydroxyestra-1,3,5(10)-trien-17-one 17-ethylene ketal. The latter compound is converted to the 3-methyl ether, and that substance is submitted to the Birch reduction to afford the 2,5(10)-enol ether, which is hydrolyzed with aqueous acetic acid to yield 11β-hydroxyester-5(10)-ene-3,17-dione 17-ethylene ketal. Rearrangement of the 5(10) double bond is effected by reaction with methanolic potassium t-butoxide to produce 11β-hydroxyestr-4-ene-3,17-dione 17-ethylene ketal. Simultaneous reduction of the 3-keto and Δ⁴ moieties affords the corresponding 3β-hydroxy-5α-estrane which is converted to the 3-p-toluenesulfonate by the procedure described herein previously. Heating of the latter substance with collidine affords the Δ²-17-ethylene ketal, and removal of the protecting group at the 17-position is effected by the reaction of aqueous hydrochloric acid, thus affording the desired 11β-hydroxy-5α-estr-2-en-17-one. The latter compound provides still another route to the remaining compounds of this invention. Reduction, typically by means of sodium borohydride in a lower alkanol, results in 5α-estr-2-ene-11β,17β-diol. Reaction with an alkyl organo-metallic reagent affords the 17-alkyl-17-hydroxy compounds of this invention. In the case of methyl magnesium bromide, for example, 17α-methyl-5α-estr-2-ene-11β,17β-diol is produced.

The (lower alkanoyl)oxy compounds of the present invention are readily obtained by reaction of the corresponding hydroxy substance with the appropriate lower alkanoic acid anhydride or halide, preferably in the presence of a suitable acid acceptor. When 11β-hydroxy-5α-estr-2-en-17-one, for example, is heated with acetic anhydride and pyridine, there is produced 11β-acetoxy-5α-estr-2-en-17-one. Reduction of the 17-keto group, in tetrahydrofuran with lithium tri-(tertiary-butoxy)aluminum hydride affords 5α-estr-2-ene-11β,17β-diol 11-acetate, which is contacted with cyclopentylpropionyl chloride in pyridine to yield 5α-estra-2-ene-11β,17β-diol 11-acetate, 17-cyclopentylpropionate.

The compounds of this invention displays valuable pharmacological properties. They possess anti-hormonal activity, for example, as is evidenced by their anti-estrogenic activity. They are, in addition, androgenic agents which possess the additional advantage of lacking anabolic side-effects.

The invention will appear more fully from the examples which follow. These examples are given by way of illustration only and are not to be construed as limiting the invention either in spirit or in scope as many modifications

EXAMPLE 1

A mixture of 23 parts of androsta-1,4-diene-3,11,17-trione, approximately 17 parts of 1,2-ethanediol, 2 parts of p-toluenesulfonic acid monohydrate and 1800 parts of benzene is heated at the reflux temperature with stirring for about 2 hours, during which time the water of reaction is continuously removed. The reaction mixture is then cooled, washed successively with aqueous sodium carbonate and water, dried over anhydrous magnesium sulfate and stripped of solvent by distillation under reduced pressure. Trituration of the resulting residue with ether affords androsta-1,4-diene-3,11,17-trione 17-ethylene ketal, melting at about 213–215°.

A solution of 5 parts of androsta-1,4-diene-3,11,17-trione 17-ethylene ketal and 10 parts of lithium tri-(tertiary-butoxy) aluminum hydride in 180 parts of tetrahydrofuran is stirred at room temperature for about 18 hours. At the end of that reaction period, there is added successively 180 parts of tetrahydrofuran, 70 parts of ether, one part of water, one part of 20% aqueous sodium hydroxide and 5 parts of water. After standing at room temperature for about 10 minutes, the precipitated solids are removed by filtration and washed on the filter with chloroform. The resulting filtrate is dried over anhydrous magnesium sulfate, then is concentrated to dryness under reduced pressure. Trituration of that residue with ether affords colorless crystals of 11β-hydroxyandrosta-1,4-diene-3,17-dione 17-ethylene ketal, melting at about 175–185°.

To a mixture of approximately 42 parts of a 30% dispersion of lithium in paraffin, 125 parts of biphenyl, approximately 69 parts of diphenylmethane, and 1,080 parts of tetrahydrofuran is added, with vigorous stirring at the reflux temperature over a period of about 30 minutes, a hot solution of 100 parts of 11β-hydroxyandrosta-1,4-diene-3,17-dione 17-ethylene ketal in 756 parts of tetrahydrofuran. Heating at the reflux temperature is continued for about 10 minutes, after which time 28 parts of methanol and 80 parts of water are cautiously added, in that order. After the addition of 400 parts more of water, the tetrahydrofuran is distilled under reduced pressure. The resulting residual mixture is cooled to room temperature, then is diluted with approximately 700 parts of a 3:1 mixture of benzene and hexane. The layers are separated, and the organic solution is washed several times with 5% aqueous potassium hydroxide. Those washings are combined with the aqueous layer, and the resulting solution is washed with hexane, then is slowly added, with vigorous stirring, to a mixture of 200 parts of acetic acid, 200 parts of water and 200 parts of ice, during which time the temperature is maintained below 10°. The resulting solid precipitate is isolated by filtration, then is washed with water and dried under reduced pressure to yield 3,11β-dihydroxyestra-1,3,5(10)-trien-17-one 17-ethylene ketal which, after recrystallization from acetone-pentane, melts at about 186–191°.

EXAMPLE 2

A mixture containing 4 parts of 3,11β-dihydroxy-estra-1,3,5(10)-trien-17-one 17-ethylene ketal, 22.8 parts of methyl iodide, 10 parts of potassium carbonate and 80 parts of methanol is heated at the reflux temperature with stirring. After approximately 30 minutes has elapsed, an additional 11.4 parts of methyl iodide is added and reflux and stirring are continued. Additional 11.4 part portions of methyl iodide are added after 90 minutes and again after 150 minutes of reaction time. After a total reaction time of 3 hours, the mixture is diluted with water, then is stripped of solvent by distillation under reduced pressure. The crystalline crude product which separates is collected by filtration, is washed on the filter with water, then is dried to afford 11β-hydroxy-3-methoxyestra-1,3,5(10)-trien-17-one 17-ethylene ketal, melting at about 124–126°. This compound is characterized further by infrared absorption maxima at about 2.86, 6.21 and 6.33 microns.

EXAMPLE 3

To a solution of approximately 140 parts of liquid ammonia, 90 parts of tetrahydrofuran and 24 parts of tertiary-butyl alcohol is added successively a solution of 5 parts of 11β-hydroxy-3-methoxyestra-1,3,5(10)-trien-17-one 17-ethylene ketal in 45 parts of tetrahydrofuran and approximately 1.2 parts of sodium pellets. The reaction mixture is stirred for about 50 minutes, after which time methanol is added in order to decompose the excess reagent. Distillation of the resulting mixture to dryness under reduced pressure affords a crystalline residue, which is collected by filtration, washed with water, then dried under reduced pressure. The resulting crude product, melting at about 145–150°, is recrystallized from a mixture of acetone and hexane to afford pure 11β-hydroxy-3-methoxyestra-2,5(10)-dien-17-one 17-ethylene ketal, melting at about 152–153°. This compound exhibits an optical rotation, in chloroform, of +119.5° and also infrared absorption maxima at about 2.79, 2.89, 5.90 and 6.00 microns.

EXAMPLE 4

A slurry of 37 parts of acetic acid, 10 parts of water and 3 parts of 11β-hydroxy-3-methoxyestra-2,5(10)-dien-17-one and 17-ethylene ketal is stirred for about 45 minutes, during which time the mixture becomes homogeneous. It is then added gradually to a slurry of 100 parts of water, 60 parts of sodium bicarbonate and 100 parts of ice. An additional 100 parts of water is then added, and the crude solid product is collected by filtration, washed on the filter with water and dried under reduced pressure at about 60°. The resulting crude material, containing 11β-hydroxyestr-5(10)-ene-3,17-dione 17-ethylene ketal, exhibits infrared absorption maxima, in potassium bromide, at about 2.89 and 5.82 microns. That material is then dissolved in 60 parts of methanol, and 0.2 part of potassium tertiary-butoxide is added. The resulting mixture is stirred at room temperature, in a nitrogen atmosphere, for about 45 minutes, then is concentrated to a small volume by distillation under nitrogen. Dilution with approximately 135 parts of benzene affords an organic solution, which is washed with water, dried over anhydrous magnesium sulfate and concentrated to dryness at reduced pressure. Trituration of the resulting residue with ether affords the crystalline product, melting at about 137–145°. Further purification is effected by recrystallization from acetone-hexane, thus producing 11β-hydroxyestra-4-ene-3,17-dione 17-ethylene ketal, melting at about 157–159°. It displays infrared absorption maxima, in a postassium bromide disc, at about 2.95, 6.03 and 6.20 microns. Nuclear magnetic resonance peaks are observed at about 68, 233, 250–260 and 352 cycles per second. This compound exhibits also an optical rotation, in chloroform, of +21°.

EXAMPLE 5

To a solution containing 245 parts of liquid ammonia, 90 parts of tetrahydrofuran and 12 parts of tertiary-butyl alcohol is added a solution of 7.75 parts of 11β-hydroxy-estra-4-ene-3,17-dione 17-ethylene ketal in 90 parts of tetrahydrofuran. To the resulting mixture is then added approximately 0.6 part of lithium wire, and stirring is continued for about one hour longer. At the end of that reaction period excess methanol is added, and the solvents are carefully removed by distillation under reduced pressure. The resulting residue is triturated with water, and the crystalline solid which forms is collected by filtration, washed on the filter with water and dried under reduced pressure. Purification of that crude product by recrystallization from acetone-hexane results in 3β,11β-dihydroxy-5α-estran-17-one 17-ethylene ketal, melting at about 245–249°.

EXAMPLE 6

To a slurry of 5.7 parts of 3β,11β-dihydroxy-5α-estran-17-one 17-ethylene ketal with 200 parts of pyridine is added, at 0° with stirring, 2.8 parts of p-toluenesulfonyl chloride, and the resulting mixture is stirred at that temperature for about 4 minutes. At the end of that time an additional 2.8 parts of p-toluenesulfonyl chloride is added, and the mixture is allowed to stand at 0° for about 16 hours. Dilution with approximately 250 parts of a 1:1 mixture of ice and water results in precipitation of the crude crystalline product, which is isolated by filtration, washed with water and dried under reduced pressure at about 60°. The crude 3-p-toluenesulfonyloxy-11β-hydroxy-5α-estran-17-one 17-ethylene ketal is mixed with 46 parts of collidine, and the resulting reaction mixture is heated at the reflux temperature for about 8 hours, then is cooled and added, dropwise with stirring, to a mixture containing 60 parts of concentrated hydrochloric acid, 100 parts of water and 100 parts of ice. The solid which precipitates is collected by filtration, washed with water and dried, then dissolved in a 5% ethyl acetate in benzene solution. Chromatography of that solution on silica gel followed by elution of the column with 10% ethyl acetate in benzene affords 11β-hydroxy-5α-estr-2-en-17-one, melting at about 126–130°. Further purification by recrystallization from acetone-hexane yields material melting at about 131–133°. This compound can be represented by the following structural formula

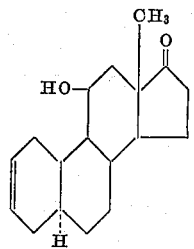

EXAMPLE 7

A mixture containing 1.3 parts of 11β-hydroxy-5α-estr-2-en-17-one, 5 parts of pyridine and 2.5 parts of acetic anhydride is heated at 90–100° for about 2 hours, then is cooled and poured carefully into 125 parts of a mixture of ice and water. The crystalline product which separates is isolated by filtration, then is washed on the filter with water and dried under reduced pressure at about 80° to afford the crude product, melting at about 95–99°. That material is further purified by recrystallization from acetonehexane, thus producing pure 11β-acetoxy-5α-estr-2-en-17-one, melting at about 111–134°. It is characterized further by the following structural formula

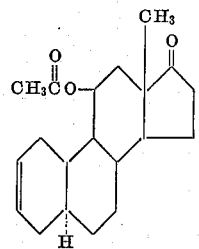

EXAMPLE 8

To a solution of 3 parts of 11β-hydroxy-5α-estr-2-en-17-one in 80 parts of isopropyl alcohol containing 16 parts of methanol is added 5 parts of sodium borohydride, and the resulting reaction mixture is stirred at room temperature for about one hour, then is carefully acidified to pH 6 by the addition of dilute hydrochloric acid. Dilution of that acidic mixture with water results in crystallization of the product, which is isolated by filtration and dried under reduced pressure to afford 5α-estr-2-ene-11β,17β-diol, melting at about 140°. Recrystallization of that substance from acetone-hexane affords a pure sample, melting at about 157–162°. This compound can be represented by the following structural formula

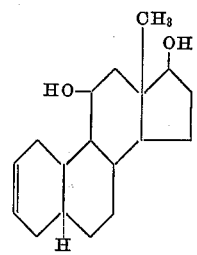

EXAMPLE 9

To a solution of 200 parts of liquid ammonia in 90 parts of tetrahydrofuran is added, with stirring, a solution of 3 parts of 11β,17β-dihydroxy-17α-methyl-estr-4-en-3-one in 80 parts of tetrahydrofuran. A total quantity of 0.6 part of lithium wire is then added over a period of about 20 minutes, during which time the blue color of the reaction mixture is maintained. At the end of that reaction period 15 parts of ammonium chloride is added, and the solvents are removed by distillation under reduced pressure. Approximately 250 parts of water is then added with stirring, and the resulting aqueous mixture is distilled under reduced pressure in order to remove any traces of organic solvent. The crude crystalline product which separates is collected by filtration, washed with water and dried to afford 17α-methyl-5α-estrane-3β,11β,17β-triol, melting at about 220–224°. Crystallization of that material from acetone-hexane affords crystals of the pure compound, melting at about 227–234°.

EXAMPLE 10

To a solution of 2.5 parts of 17α-methyl-5α-estrane-3β,11β,17β-triol in 6 parts of pyridine is added 2.5 parts of p-toluenesulfonyl chloride, during which time the reaction mixture is kept under a nitrogen atmosphere and is cooled in order to prevent the temperature from rising above room temperature. At the end of the addition period, the mixture is allowed to stand at room temperature for about 16 hours, then is poured carefully into an ice cold solution of dilute hydrochloric acid. The resulting precipitate is collected by filtration, then is purified by recrystallization from aqueous acetone to afford 17α-methyl-3β-p-toluenesulfonyloxy - 5α - estrane-11β,17β-diol, melting at about 139–142° with decomposition.

EXAMPLE 11

A solution of 3.2 parts of 17α-methyl-3β-p-toluenesulfonyloxy-5α-estrane-11β,17β-diol in 92 parts of collidine is heated at the reflux temperature, in a nitrogen atmosphere with stirring, for about 8 hours, then is stored at room temperature for about 16 hours. Careful dilution with ice cold dilute sulfuric acid results in precipitation of the solid product. Extraction of that aqueous acidic mixture with ether affords an organic solution which is washed successively with water, saturated aqueous sodium chloride and aqueous sodium bicarbonate, then is dried over anhydrous sodium sulfate containing decolorizing carbon and stripped of solvent by distillation under reduced pressure. The resulting white crude produce is purified by recrystallization from aqueous methanol to afford 17α-methyl-5α-estr-2-ene-11β,17β-diol, melting at about 198–201°, and characterized by the following structural formula

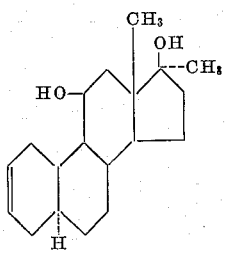

EXAMPLE 12

To a solution of 1.2 parts of 11β-acetoxy-5α-estr-2-en-17-one in 18 parts of tetrahydrofuran is added, with stirring at 0–5°, a solution of 3.6 parts of lithium tri-(tertiary-butoxy) aluminum hydride in 18 parts of tetrahydrofuran. After completion of the addition, the reaction mixture is stirred for about one hour, during which time the mixture reaches ambient temperature. Careful dilution with ice cold dilute acetic acid affords an aqueous mixture which is extracted with ether. The ether layer is separated, washed successively with water and dilute aqueous sodium bicarbonate, then dried over anhydrous sodium sulfate containing decolorizing carbon. Removal of the solvent by distillation under reduced pressure affords 5α-estr-2-ene-11β,17β-diol 11-acetate as a glass. This compound exhibits infrared absorption maxima, in chloroform, at about 2.75, 3.41, 5.78, 6.02 and 7.98 microns and can be represented by the following structural formula

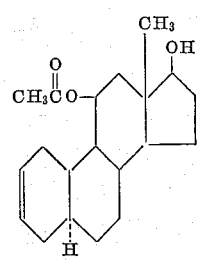

EXAMPLE 13

To a solution of 1.2 parts of 5α-estr-2-ene-11β,17β-diol 11-acetate in 15 parts of pyridine is added 1.5 parts of 2-cyclopentylpropionyl chloride, during which period of addition the temperature is maintained at room temperature by means of cooling with an ice bath. The reaction mixture is then poured into ice and water, and the oily layer which separates is extracted into ether. The resulting organic solution is washed with water, dried over anhydrous sodium sulfate containing decolorizing carbon and stripped of solvent by distillation under reduced pressure. The oily residue is dissolved in benzene, and that organic solution is chromatographed on a silica gel column. Elution of the column with 1% ethyl acetate in benzene followed by recrystallization from aqueous methanol of the fraction thus obtained affords 5α-estr-2-ene - 11β,17β - diol 11-acetate, 17-cyclopentylpropionate, melting at about 71–74°. This compound can be represented by the following structural formula

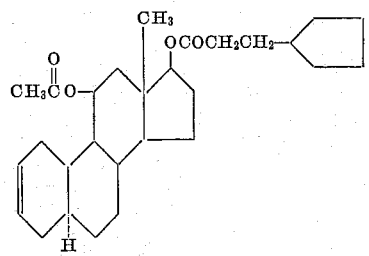

EXAMPLE 14

When an equivalent quantity of 17α-ethyl-11β,17β-dihydroxyestr-4-en-3-one is subjected to the successive processes of Examples 9–11, there is obtained 17α-ethyl-5α-estr-2-ene-11β,17β-diol.

EXAMPLE 15

The reaction of equivalent quantities of 17α-ethyl-5α-estr-2-ene-11β,17β-diol and propionic anhydride by the procedure described in Example 7 results in 17α-ethyl-5α-estr-2-ene-11β,17β-diol 11-propionate.

EXAMPLE 16

By substituting an equivalent quantity of propionic anhydride and otherwise proceeding according to the processes described in Example 7, there is obtained 11β-hydroxy-5α-estr-2-ene-17-one 11-propionate.

EXAMPLE 17

When an equivalent quantity of 11β-propionoxy-5α-estr-2-en-17-one is reduced by the procedure described in Example 12, there is obtained 5α-estr-2-ene-11β,17β-diol 11-propionate.

EXAMPLE 18

The reaction of equivalent quantities of 5α-estr-2-ene-11β,17β-diol 11-propionate and 3-cyclohexylbutyryl chloride by the procedure described in Example 13 results in 5α-estr-2-ene-11β,17β-diol 11-propionate, 17-(3-cyclohexylbutyrate).

What is claimed is:
1. A compound of the formula

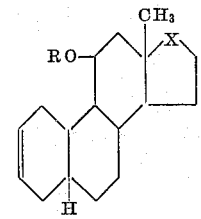

wherein R is a member of the class consisting of hydrogen and a radical of the formula

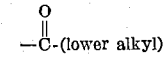

and X is selected from the group consisting of carbonyl and radicals of the formula

Y being a member of the class consisting of hydrogen and radicals of the formula

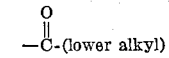

and Z being a member of the class consisting of hydrogen and lower alkyl radicals.

2. A compound of the formula

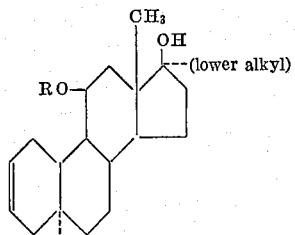

wherein R is a member of the class consisting of hydrogen and radicals of the formula

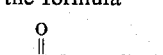

3. A compound of the formula
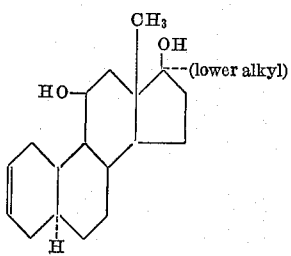
4. A compound of the formula
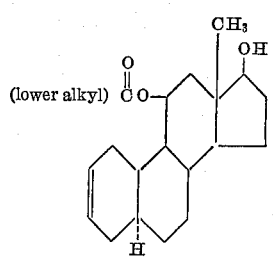
5. A compound of the formula
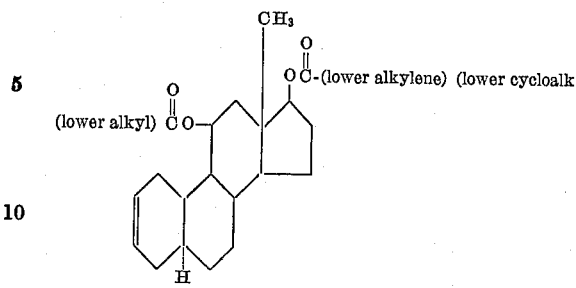
6. 17α-methyl-5α-estr-2-ene-11β,17β-diol.
7. 11β-hydroxy-5α-estr-2-en-17-one.
8. 5α-estr-2-ene-11β,17β-diol.
9. 11β-acetoxy-5α-estr-2-en-17-one.
10. 5α-estr-2-ene-11β,17β-diol 11-acetate, 17-cyclopentylpropionate.
11. 5α-estr-2-ene-11β,17β-diol 11-acetate.
No references cited.
LEWIS GOTTS, *Primary Examiner.*
ELBERT L. ROBERTS, *Examiner.*